United States Patent [19]

Suzuki

[11] Patent Number: 4,695,846
[45] Date of Patent: Sep. 22, 1987

[54] INK-JET RECORDING PROCESS

[75] Inventor: Eiichi Suzuki, Tokyo, Japan

[73] Assignee: Canon Kabushiki Kaisha, Tokyo, Japan

[21] Appl. No.: 938,343

[22] Filed: Dec. 3, 1986

Related U.S. Application Data

[63] Continuation of Ser. No. 834,147, Feb. 25, 1986, abandoned, which is a continuation of Ser. No. 585,935, Mar. 5, 1984, abandoned.

[30] Foreign Application Priority Data

Aug. 3, 1983 [JP] Japan .................................. 58-37704

[51] Int. Cl.$^4$ .................... G01D 15/16; C09D 11/00; H04N 1/46; G03C 5/00
[52] U.S. Cl. ...................................... 346/1.1; 346/46; 346/75; 346/140 R; 106/20; 106/22; 430/30; 358/75

[58] Field of Search ...................... 346/1.1, 75, 140 R, 346/46; 106/20, 22; 430/30; 358/75

[56] References Cited

U.S. PATENT DOCUMENTS 3,951,668 4/1976 Schumacher et al. ................. 106/20
4,446,470 5/1984 Sugiyama et al. ............... 346/140 R Primary Examiner—E. A. Goldberg
Assistant Examiner—Gerald E. Preston
Attorney, Agent, or Firm—Fitzpatrick, Cella, Harper & Scinto

[57] ABSTRACT

An ink-jet recording process for recording colored images comprises using n ("n" represents an integer of 2 or more) kinds of inks different from one another in dye concentration to express one color, wherein the inks are toned so that hues given by said n kinds of inks are continuous.

13 Claims, 14 Drawing Figures

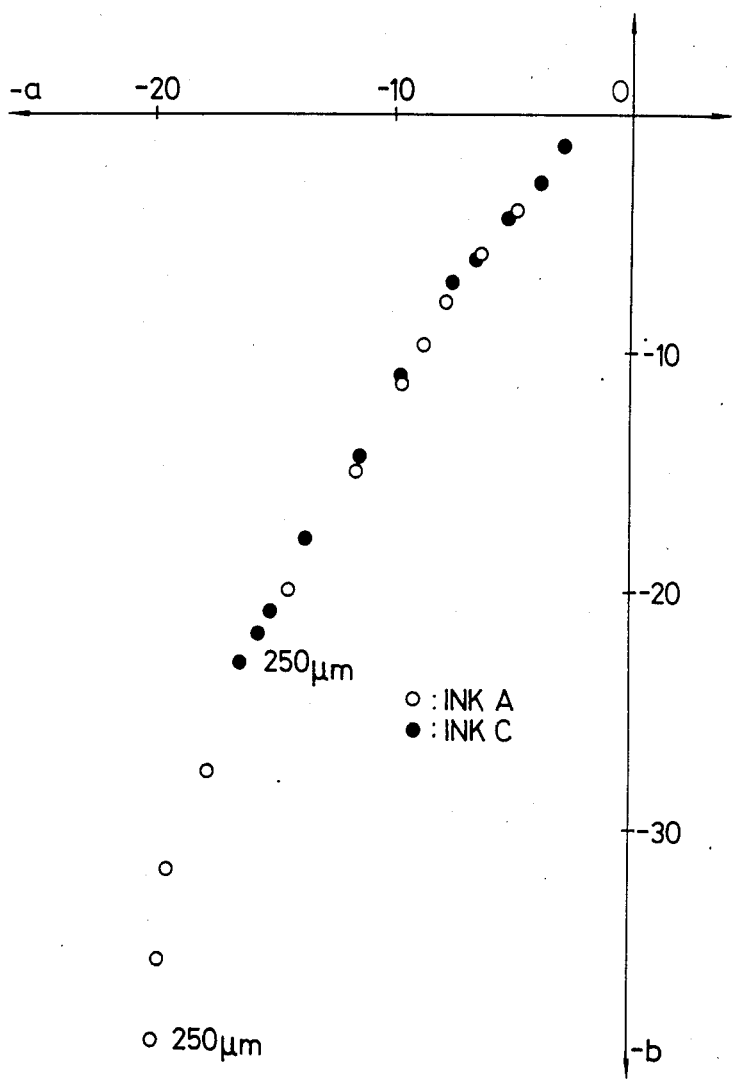

INK-JET RECORDING PROCESS

This application is a continuation of application Ser. No. 834,147 filed Feb. 25, 1986 now abandoned, which is a continuation of Ser. No. 585,935, filed Mar. 5, 1984, now abandoned.

BACKGROUND OF THE INVENTION

1. Field of the Invention

The present invention relates to an ink-jet recording process and more particularly to an ink-jet recording process carried out by using a plural number of color inks.

2. Description of the Prior Art

Heretofore, in multicolor or full-color recording by the ink-jet recording process, various proposals have been made for the purpose of obtaining colored picture images of high quality. Among them, there have been proposed recording processes in which n ("n" represents an integer of 2 or more) kinds of inks which differ from one another in dye concentration are employed for one color for the purpose of obtaining colored picture images having high reflection density (optical density, hereinafter simply referred to as "O.D."), wide range of color-reproducibility and excellent gradient (See, for example, Japanese Patent Laid-Open No. 156264/1982).

However, even when ink-jet recording is carried out by using the inks prepared from one dye, the hue reproduced by each of the inks varies in compliance with the dye concentration. Therefore, when gradation in one color is pursued, the variation in the hue becomes discontinuous.

In particular, in the full-color recording, the hues of the primary colors as used (yellow, magenta and cyan) vary discontinuously upon gradation expression, which makes the picture designing extremely difficult. Alternatively one may also consider to correct color deviations by masking, but there remains a disadvantage that production costs are increased because of the complicatedness of the picture processing and the increments of electric circuits resulting from the increase in parameters to be corrected in proportion to the number of inks.

FIG. 1 is a Hunter's chromaticity diagram of recorded matters as expressed analogically by the gradation expression by using the inks of the following composition. Recording is carried out by the drop-on-demand type ink-jet recording process, and the gradation expression is obtained by varying the dot size.

| Ink No. 1 (Composition) | |
| --- | --- |
| Acid Red 94 | 2 parts by weight |
| Water | 48 parts by weight |
| Ethylene glycol | 24 parts by weight |
| Glycerol | 24 parts by weight |
| Triethanolamine | 1.9 parts by weight |
| Surfactant (trade name: Emal NC; mfd. by Kao Soap Co., Ltd.) | 0.1 parts by weight |

| Ink No. 2 (Composition) | |
| --- | --- |
| Acid Red 94 | 0.7 parts by weight |
| Water | 49.3 parts by weight |
| Ethylene glycol | 24 parts by weight |
| Glycerol | 24 parts by weight |
| Triethanolamine | 1.9 parts by weight |
| Surfactant (trade name: Emal NC; mfd. by Kao Soap Co., Ltd.) | 0.1 parts by weight |

FIG. 2 shows the resulting measured values of O.D. of the above recorded matters. As can be seen from FIG. 2, there are obtained recorded matters in which O.D. values vary continuously and are reproduced over a wide range by using Ink No. 1 and Ink No. 2 respectively, according to the O.D. range reproduced by itself. On the other hand, as can be seen from FIG. 1, when the gradation expression as shown in FIG. 2 is performed, the hues reproduced by Ink No. 1 and Ink No. 2 do not correspond with the continuity of the gradation expression. Therefore, the variation in the hue becomes discontinuous, and color deviation occurs.

SUMMARY OF THE INVENTION

An object of the present invention is to provide an ink-jet recording process which does not cause color deviation between n ("n" represents an integer of 2 or more) kinds of inks differing from one another in dye concentration used to express one color.

According to the present invention, there is provided an ink-jet recording process for recording colored images comprising using n ("n" represents an integer of 2 or more) kinds of inks different from one another in dye concentration to express one color, wherein the inks are toned so that hues given by said n kinds of inks are continuous.

BRIEF DESCRIPTION OF THE DRAWINGS

FIGS. 1, 4, 6, 8, 12 and 14 are chromaticity diagrams.

DETAILED DESCRIPTION OF THE PREFERRED EMBODIMENTS

Figure 1:
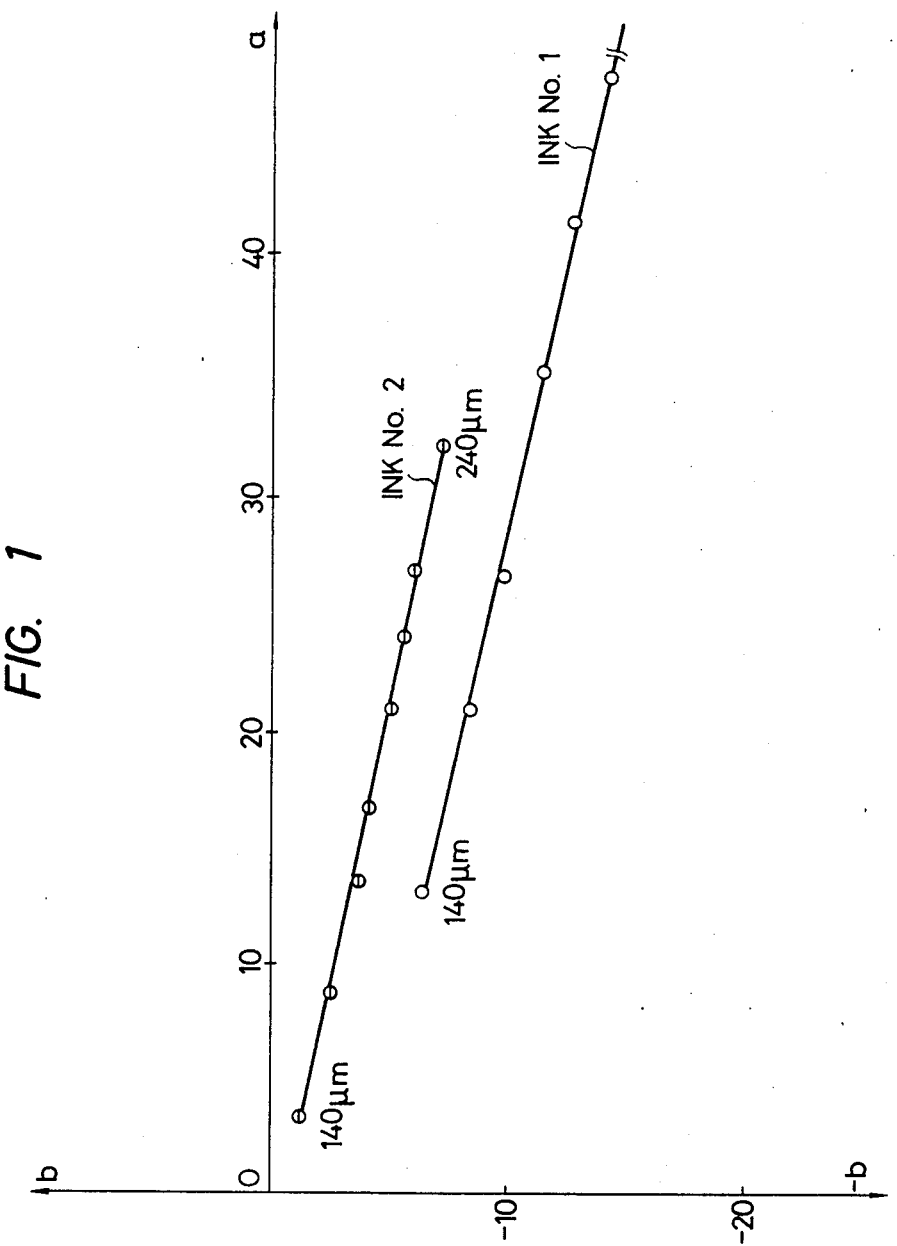
Figure 2:
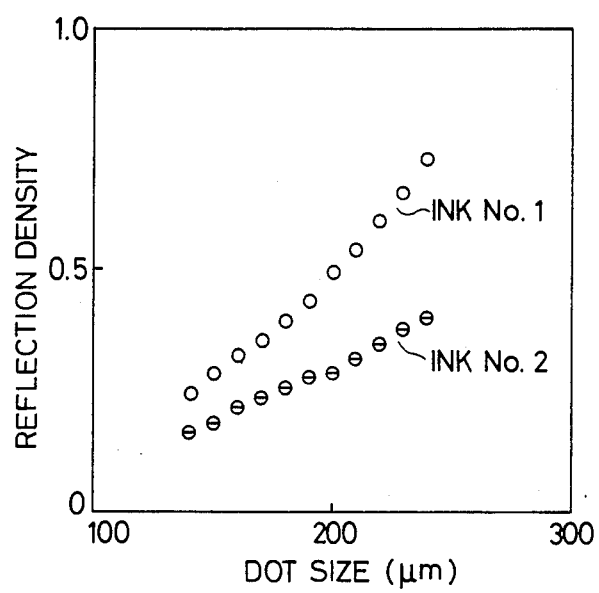
FIGS. 2, 3, 5, 7, 9, 11 and 13 are graphs showing measured values of O.D. of recording materials recorded by the ink-jet recording process.

Each of the inks as used in this invention comprises, in principle, a dye as a colorant and a suitable solvent. As the dyes, there may be employed direct dyes, acid dyes, and the like giving a color of cyan, magenta, yellow, or the like. The process of the present invention can be also applied to a black color.

The solvent is composed primarily of water and a wetting agent. For a wetting agent or the other solvent, various types of water-soluble organic solvents may preferably be employed.

As the water-soluble organic solvents, there may be mentioned $C_1$-$C_4$ alkyl alcohols such as methanol, ethanol, n-propanol, isopropanol, n-butanol, sec-butanol, tert-butanol, isobutanol, and the like; amides such as dimethylformamide, dimethylacetamide, and the like; ketones or keto alcohols such as acetone, diacetone alcohol, and the like; ethers such as tetrahydrofuran, dioxane, and the like; polyalkylene glycols such as polyethylene glycol, polypropylene glycol, and the like; $C_2$-$C_6$ alkylene group—containing alkylene glycols such as ethylene glycol, propylene glycol, butylene glycol, triethylene glycol, 1,2,6-hexane triol, thio glycol, hexylene glycol, diethylene glycol, and the like; glycerol; lower alkyl ethers of polyhydric alcohols such as ethylene glycol methyl ether, diethylene glycol methyl and ethyl ethers, triethylene glycol monomethyl and monoethyl ethers, and the like; and nitrogen—containing heterocyclic ketones such as N-methyl-2-pyrrolidone, 1,3-dimethyl-2-imidazolydinone, and the like.

Among these various water-soluble organic solvents, preferred ones are polyhydric alcohols such as diethylene glycol and the like, and lower alkyl ethers of polyhydric alcohols such as triethylene glycol monomethyl and monoethyl ethers, and the like. The polyhydric alcohols are particularly preferred since these are particularly effective as a wetting agent to prevent clogging of ink-jet nozzles by the precipitation of dyes based on vaporization of water in inks. Nitrogen-containing heterocyclic ketones such as N-methyl-2-pyrrolidone and the like are also particularly preferred since these are particularly effective as a solubilizing agent to increase the solubility in the dyes to the solvents.

The contents of said water-soluble organic solvents in the ink are generally 5–95%, preferably 10–80%, and more preferably 20–50%, by weight based on the total weight of ink.

A wide range of the water content may be chosen depending upon the kinds and compositions of solvent components or upon desired characteristics of inks. The water content is generally 10–90%, preferably 10–70%, and more preferably 20–70%, by weight based on the total weight of ink.

The process of the present invention will now be illustrated by way of the following examples which are for the purpose of illustration only and are in no way considered as limiting.

EXAMPLE 1

Dye: C.I. Direct Blue 86

| Solvent: | |
|---|---|
| Water | 52.9 parts by weight |
| Ethylene glycol | 15.0 parts by weight |
| Glycerol | 15.0 parts by weight |
| N—methyl-2-pyrrolidone | 15.0 parts by weight |
| Triethanolamine | 2.0 parts by weight |
| Surfactant (trade name: Emal NC; mfd. by Kao Soap Co., Ltd.) | 0.1 parts by weight |

Figure 3:
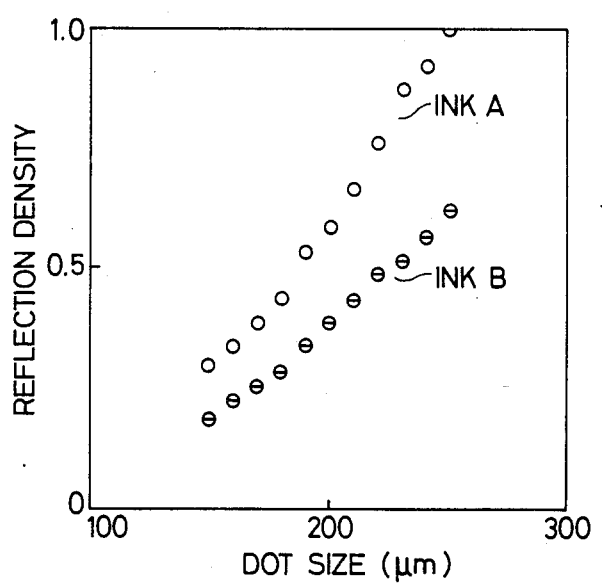
Figure 4:
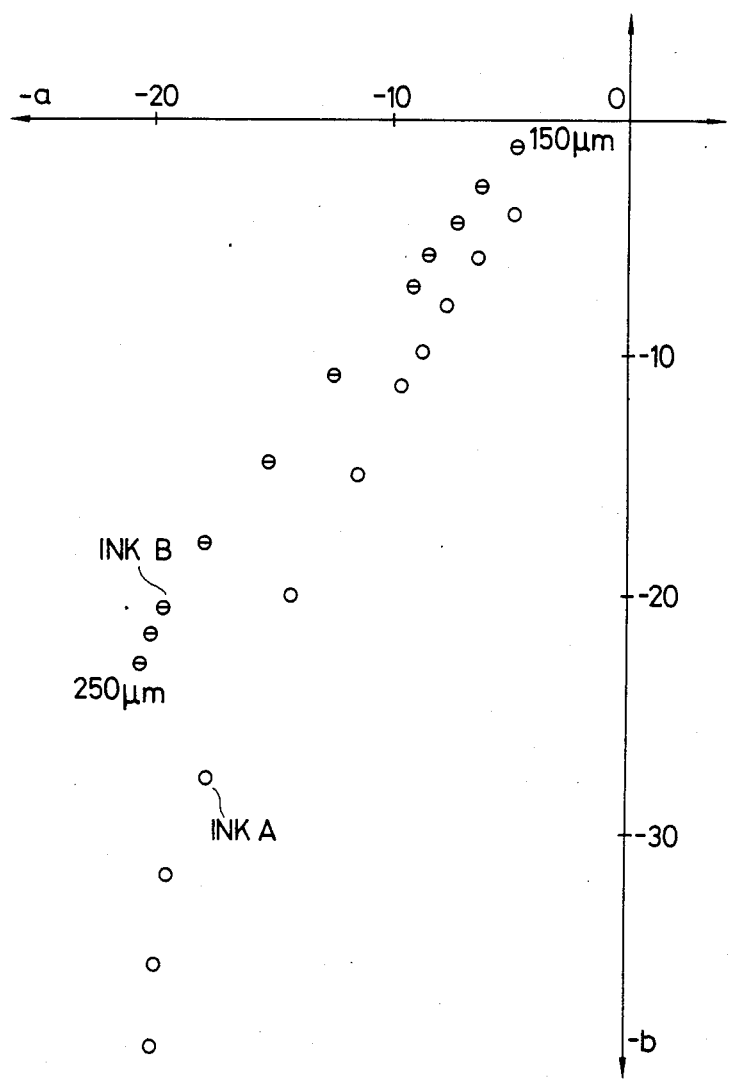
Figure 5:
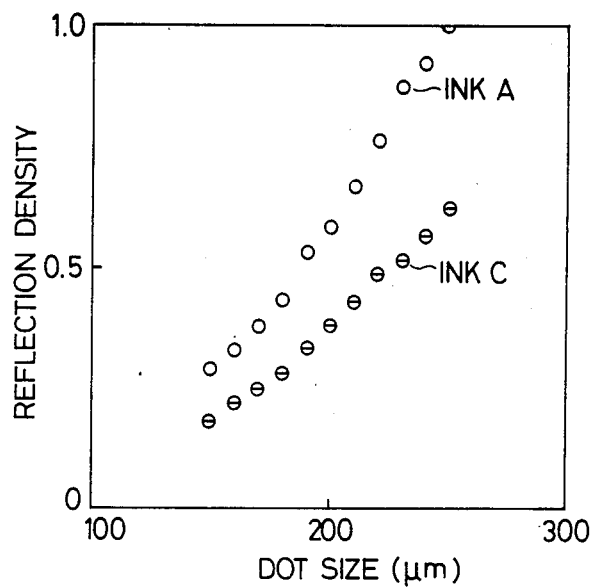

The above dye and solvent were mixed to prepare two kinds of mixtures having a different dye concentration, i.e , 2.0% by weight and 0.7% by weight. The mixtures were then respectively stirred, and filtered to give Ink A (Dye concentration: 2.0% by weight) and Ink B (Dye concentration 0.7% by weight). The above inks were jetted respectively onto recording matters using a drop-on-demand type of ink-jet printing head while varying the dot size on papers within the range of about 150–250 μm. The measured values of reflection density (O.D.) of the resulting recorded matters are shown in FIG. 3, and the chromaticity diagram are shown in FIG. 4. As can be clearly seen from FIGS. 3 and 4, the variation in the hue became discontinuous and the hue curves did not overlap each other while O.D. values were continuous. Accordingly, Ink C was prepared by adding 5.2% by weight of C.I. Acid Red 94 based on the content of C.I. Direct Blue 86 to Ink B for the purpose of toning, so that the hue curve of Ink B might be situated on the extension of the hue curve of Ink B. Then, Inks A and C were jetted respectively on the recording matters using the above printing head while varying the dot size in the same manner as mentioned above. There are shown the measured values of O.D. of the resulting recorded matters in FIG. 5 and the chromaticity diagram in FIG. 4. As can be seen from FIG. 6, the hue curve of Ink C overlaps on that of Ink A, and therefore a continuity of the variation in hue was recognized.

EXAMPLE 2

Dye: C.I. Acid Yellow 23

| Solvent: | |
|---|---|
| Water | 52.9 parts by weight |
| Ethylene glycol | 15.0 parts by weight |
| Glycerol | 15.0 parts by weight |
| N—methyl-2-pyrrolidone | 15.0 parts by weight |
| Triethanolamine | 2.0 parts by weight |
| Surfactant (trade name: Emal NC; mfd. by Kao Soap Co., Ltd.) | 0.1 parts by weight |

Figure 7:
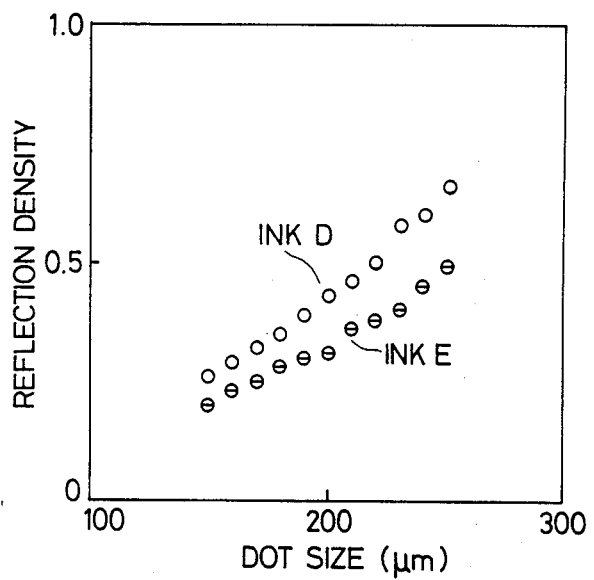
Figure 8:
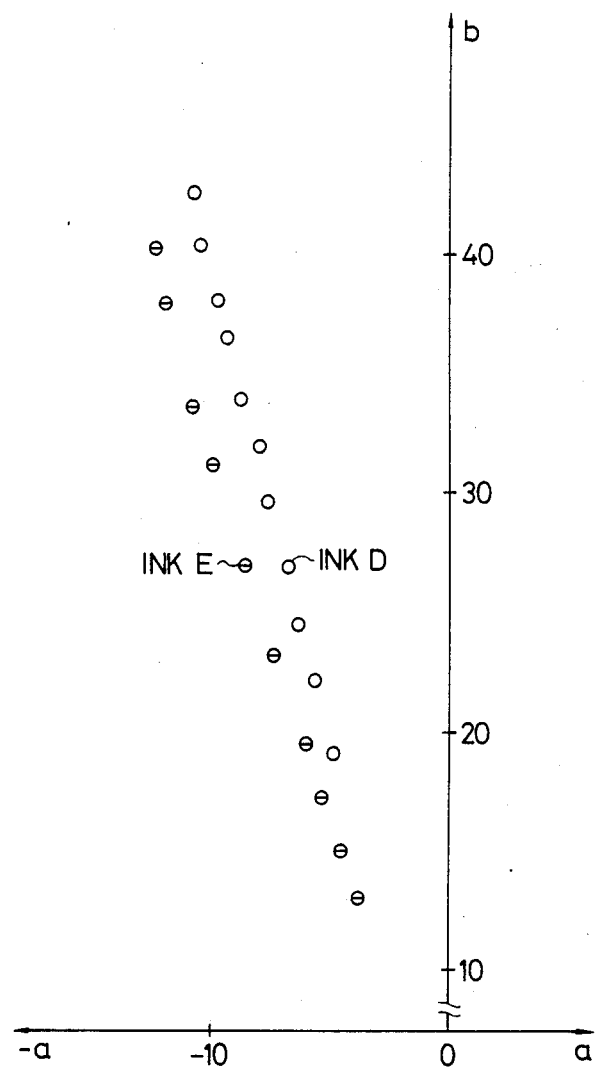
Figure 9:
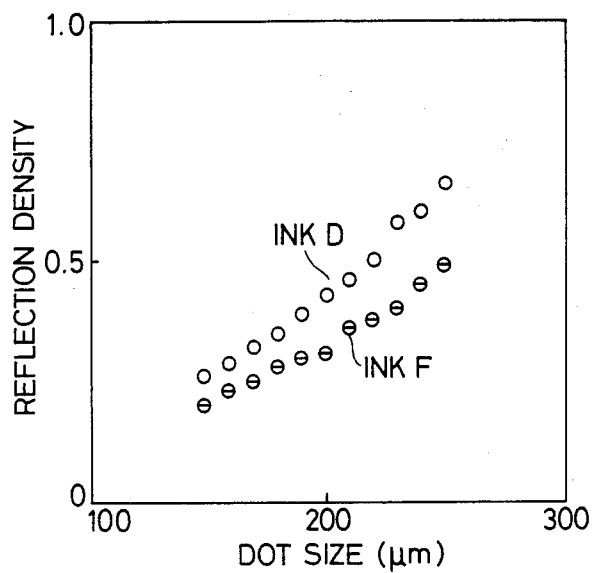
Figure 10:
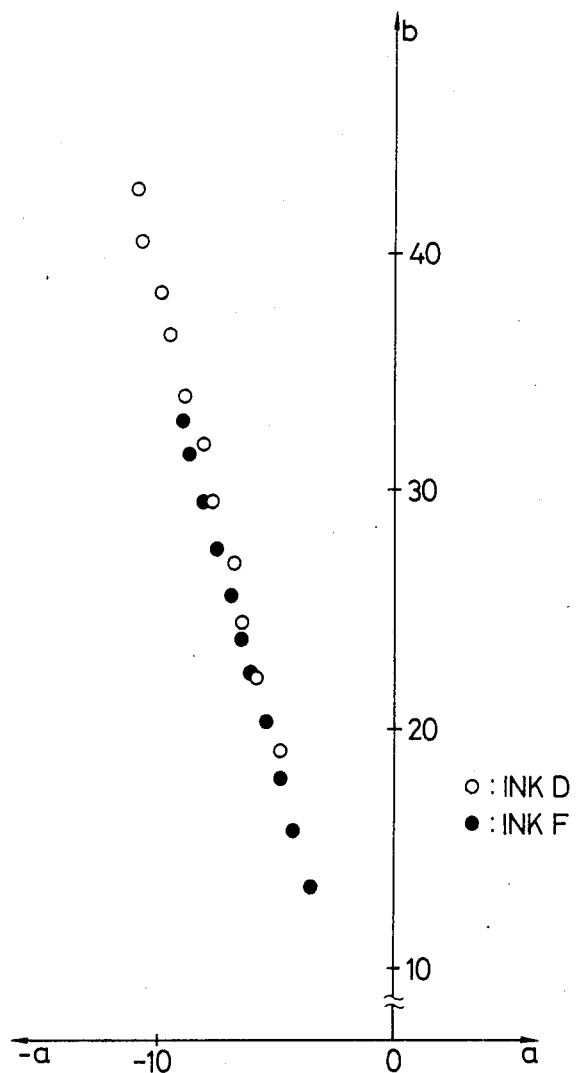

The above dye and solvent were mixed to prepare two kinds of mixtures having a different dye concentration, i.e., 2.0% by weight and 0.7% by weight. The mixtures were then respectively stirred, and filtered to give Ink D (Dye concentration: 2.0% by weight) and Ink E (Dye concentration: 0.7% by weight). The above inks were jetted respectively onto recording matters in the same manner as in Example 1. The resulting measured values of O.D. are shown respectively in FIG. 7, and the chromaticity diagram are shown in FIG. 8. Since it was found from FIG. 8 that the hue curve of Ink E was situated at the position shifted to green color compared with that of Ink D, Ink F was prepared by adding 1.0% by weight of C.I. Acid Red 92 based on the content of I.C. Acid Yellow 23 to Ink E for the purpose of toning. Then Inks D and F were jetted respectively onto the recording matters in the same manner as in Example 1. The resulting measured values of O.D are shown in FIG. 9 and the chromaticity diagram are shown in FIG. 10. As can be seen from FIG. 10, the hue curve of Ink F overlaps on that of Ink D, and therefore, a continuity of the variation in the hue was obtained by using Inks D and F.

EXAMPLE 3

Dye: A 1:1 by weight mixture of C.I. Acid Red 92 and C.I. Acid Red 94

Solvent: The same as in Example 1

Figure 11:
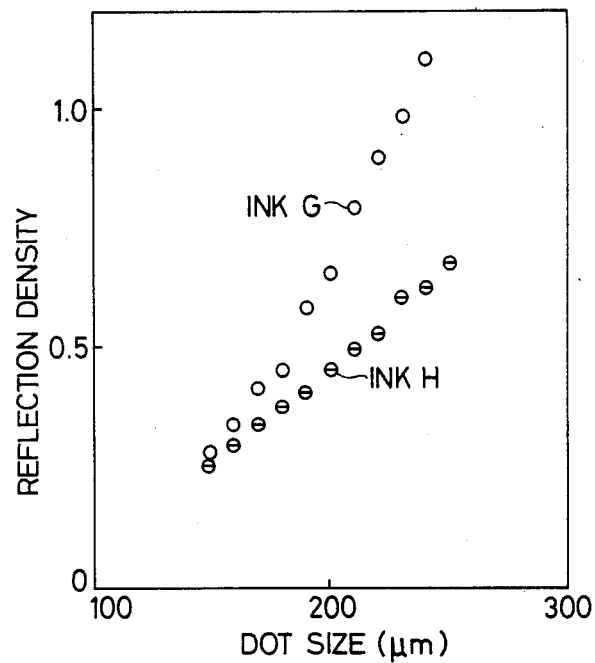
Figure 12:
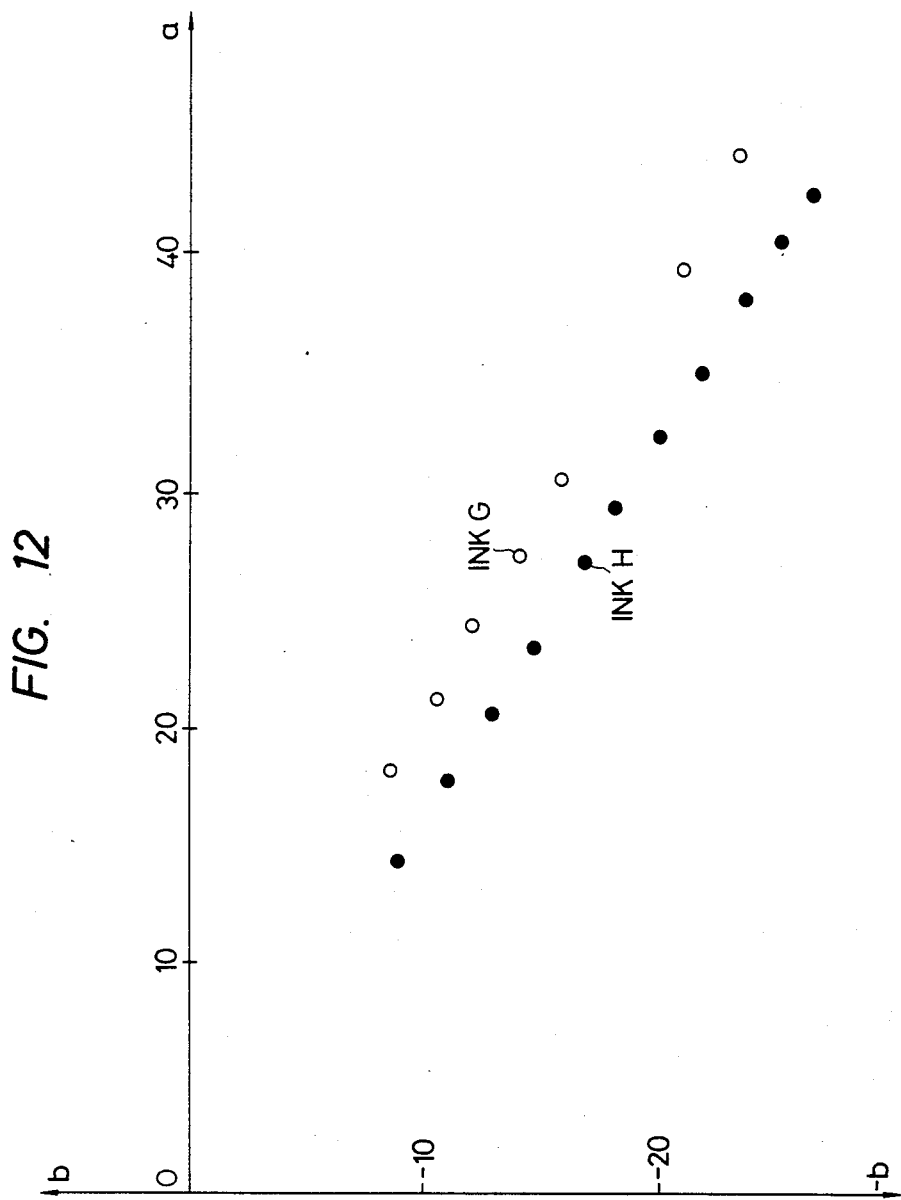
Figure 13:
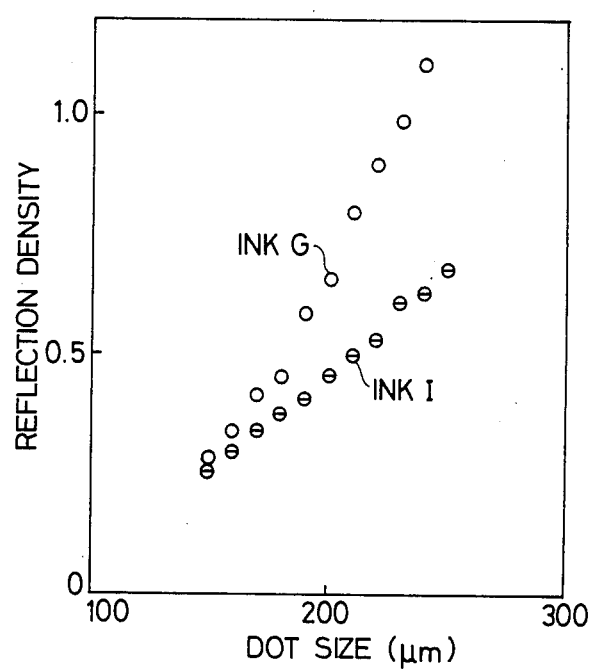

The above dye and solvent were mixed to prepare two kinds of mixtures having a different dye concentration, i.e. 2.0% by weight and 0.7% by weight. The mixtures were then respectively stirred and filtered to give Ink G (Dye concentration: 2.0% by weight) and Ink H (Dye concentration: 0.7% by weight). These Inks were jetted respectively onto recording matters in the same manner as in Example 1. The measured values of O.D. of the resulting recorded matters are shown in FIG. 11, and the chromaticity diagram is shown in FIG. 12. Since it was found from FIG. 12 that the hue curve of Ink H was situated at the position shifted to purple color compared with that of Ink G, Ink I was prepared by changing the weight ratio of C.I. Acid Red 92:C.I. Acid Red 94 to 1:0.3. Inks I and G were jetted respectively onto recording matters in the same manner as in Example 1. The measured values of O.D. of the resulting recorded matters are shown in FIG. 13, and the chromaticity diagram is shown in FIG. 14.

Figure 14:
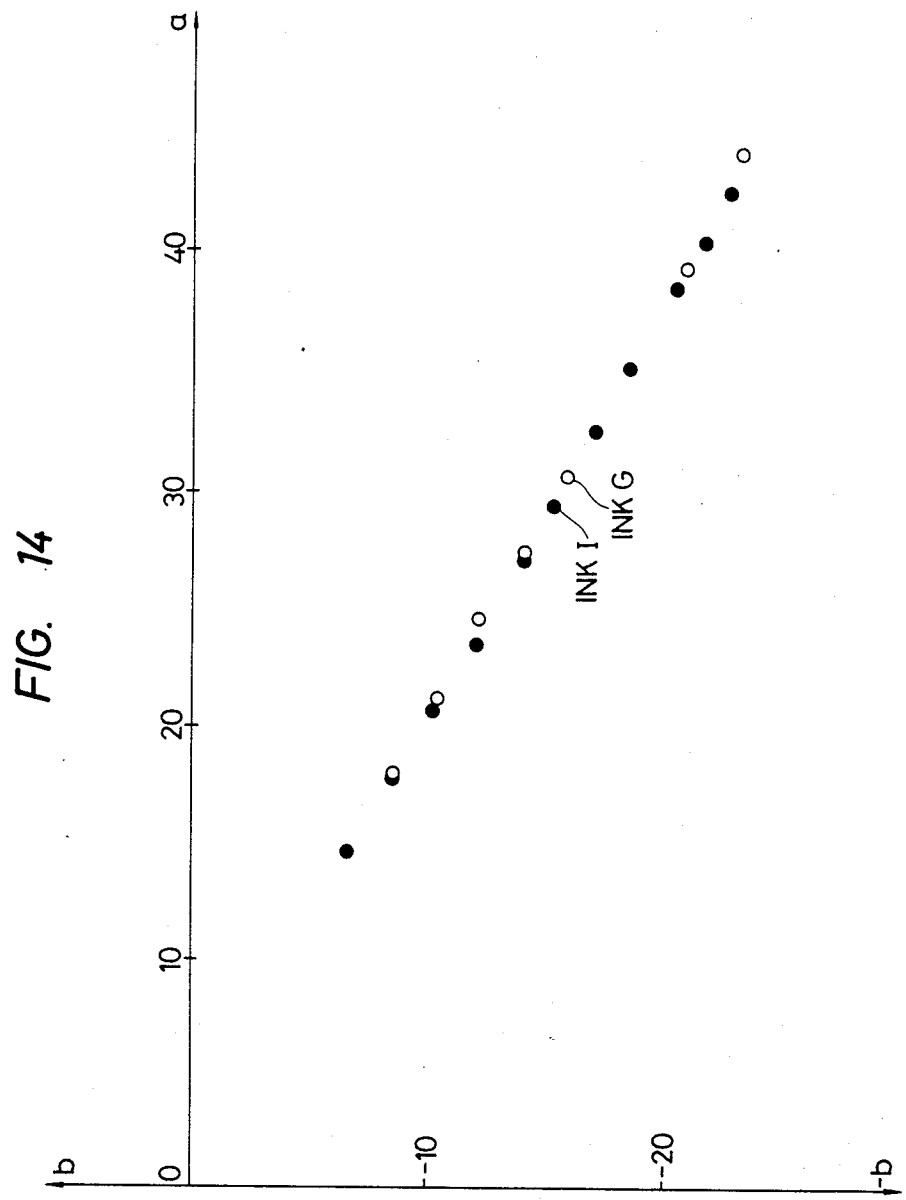

As can be seen from FIG. 14, the hue curve of Ink I overlaps on that of Ink G, and therefore a continuity of the variation in the hue was obtained.

EXAMPLE 4

Using six kinds of color inks A, C, D, F, G and I as prepared in Examples 1-3, color photographs were reproduced by the use of the above ink-jet printing head. Then, there were obtained colored images of high quality having high reflection density, wide range of color-reproducibility and excellent gradient.

I claim:

1. An ink jet color recording process of impacting ink dots of varying sizes on a recording medium, said ink dots provided by at least one of at least two inks which express a color, each ink comprising at least one dye of the same color, a solvent and a wetting agent, wherein each said ink exhibits a continuous gradient of image density when used individually and a discontinuous gradient when used together, said recording process capable of expressing an image density gradient of color from a lower density to a higher density, said image density gradient characterized by a change in chroma or a change in brightness, wherein said expressed color maintains a substantially constant hue throughout said gradient, which comprises;
    (a) toning at least one of said inks by adding a toning dye to said ink and thereby substantially reducing or eliminating said discontinuous gradient, wherein said toning dye is at least one of a dye of a different color or a dye of the same color in a different molar ratio; and
    (b) recording an ink jet color image with said inks.

2. The process of claim 1 in which the color inks include a black ink.

3. The ink jet color recording process of claim 1, wherein said solvent is a mixture of water and a water-soluble organic solvent.

4. The ink jet color recording process of claim 3, wherein the water-soluble organic solvent is present between 5-95% by weight of said ink.

5. The ink jet color recording process of claim 3, wherein the water is present between 10-90% by weight of said ink.

6. An ink jet color recording process of impacting ink dots of varying sizes between about 150 μm to 250 μm on a recording medium, said ink dots provided by at least one of at least two inks which express a color, each ink comprising at least one dye of the same color, a solvent and a wetting agent, wherein each said ink exhibits a continuous gradient of image density when used individually and a discontinuous gradient when used together, said recording process capable of expressing an image density gradient of color from a lower density to a higher density, said image density gradient characterized by a change in chroma or a change in brightness, wherein said expressed color maintains a substantially constant hue throughout said gradient, which comprises;
    (a) toning at least one of said inks by adding a toning dye to said ink and thereby substantially reducing or eliminating said discontinuous gradient, wherein said toning dye is at least one of a dye of a different color or a dye of the same color in a different molar ratio; and
    (b) recording an ink jet color image with said inks.

7. The ink jet color recording process of claim 6, wherein said solvent is a mixture of water and a water-soluble organic solvent.

8. The ink jet color recording process of claim 7, wherein the water-soluble organic solvent is present between 5-95% by weight of said ink.

9. The ink jet color recording process of claim 7, wherein the water is present between 10-90% by weight of said ink.

10. The ink jet color recording process of claim 6, wherein the color image is recorded using at least yellow, magenta and cyan colors.

11. An ink jet color recording process of impacting ink dots of varying sizes on a recording medium, said ink dots provided by at least one of at least two inks which express a color, each ink comprising at least one dye of the same color, a solvent which is a mixture of water and a water-soluble organic solvent and a wetting agent, wherein each said ink exhibits a continuous gradient of image density when used individually and a discontinuous gradient when used together, said recording process capable of expressing an image density gradient of color from a lower density to a higher density, said image density gradient characterized by a change in chroma or a change in brightness, wherein said expressed color maintains a substantially constant hue throughout said gradient, which comprises;
    (a) toning at least one of said inks by adding a toning dye to said ink and thereby substantially reducing or eliminating said discontinuous gradient, wherein said toning dye is at least one of a dye of a different color or a dye of the same color in a different molar ratio; and
    (b) recording an ink jet color image with said inks, wherein the color image is recorded using at least yellow, magenta and cyan colors.

12. The ink jet color recording process of claim 11, wherein the water-soluble organic solvent is present between 5-95% by weight of said ink.

13. The ink jet color recording process of claim 11, wherein the water is present between 10-90% by weight of said ink.

* * * * *